March 10, 1964   H. FISHER   3,123,956
BOTTLE CASING APPARATUS AND METHOD
Filed Nov. 20, 1961   6 Sheets-Sheet 4
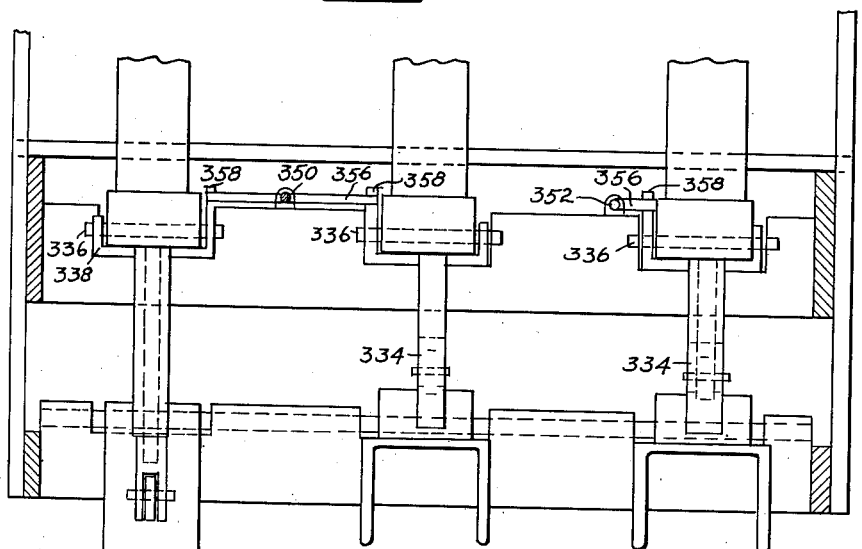
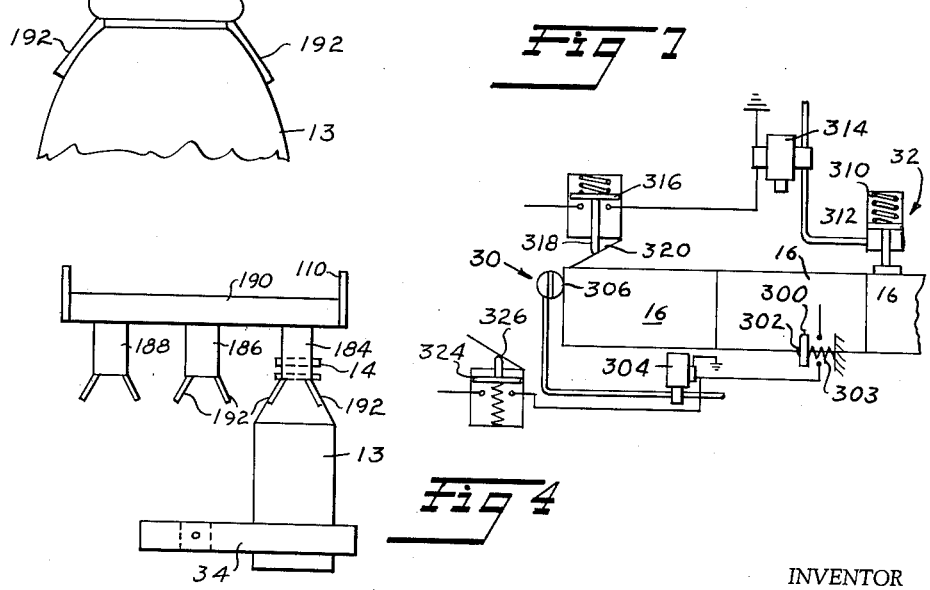
INVENTOR
HOMER FISHER
BY Scrivener & Parker
ATTORNEYS INVENTOR
HOMER FISHER
BY
Scrivener & Parker
ATTORNEYS March 10, 1964  H. FISHER  3,123,956
BOTTLE CASING APPARATUS AND METHOD
Filed Nov. 20, 1961  6 Sheets-Sheet 6
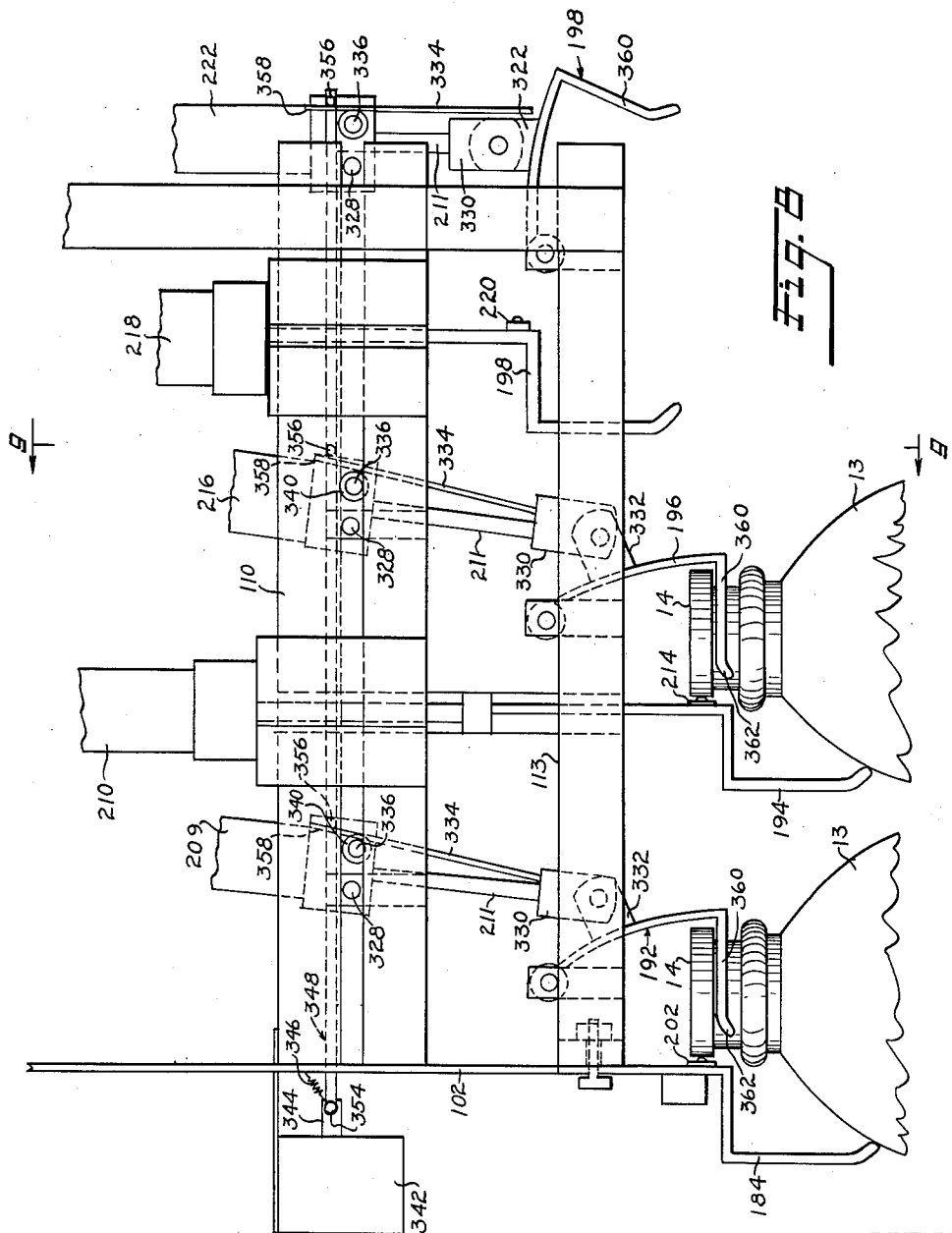
INVENTOR
HOMER FISHER
BY Scrivener & Parker
ATTORNEY

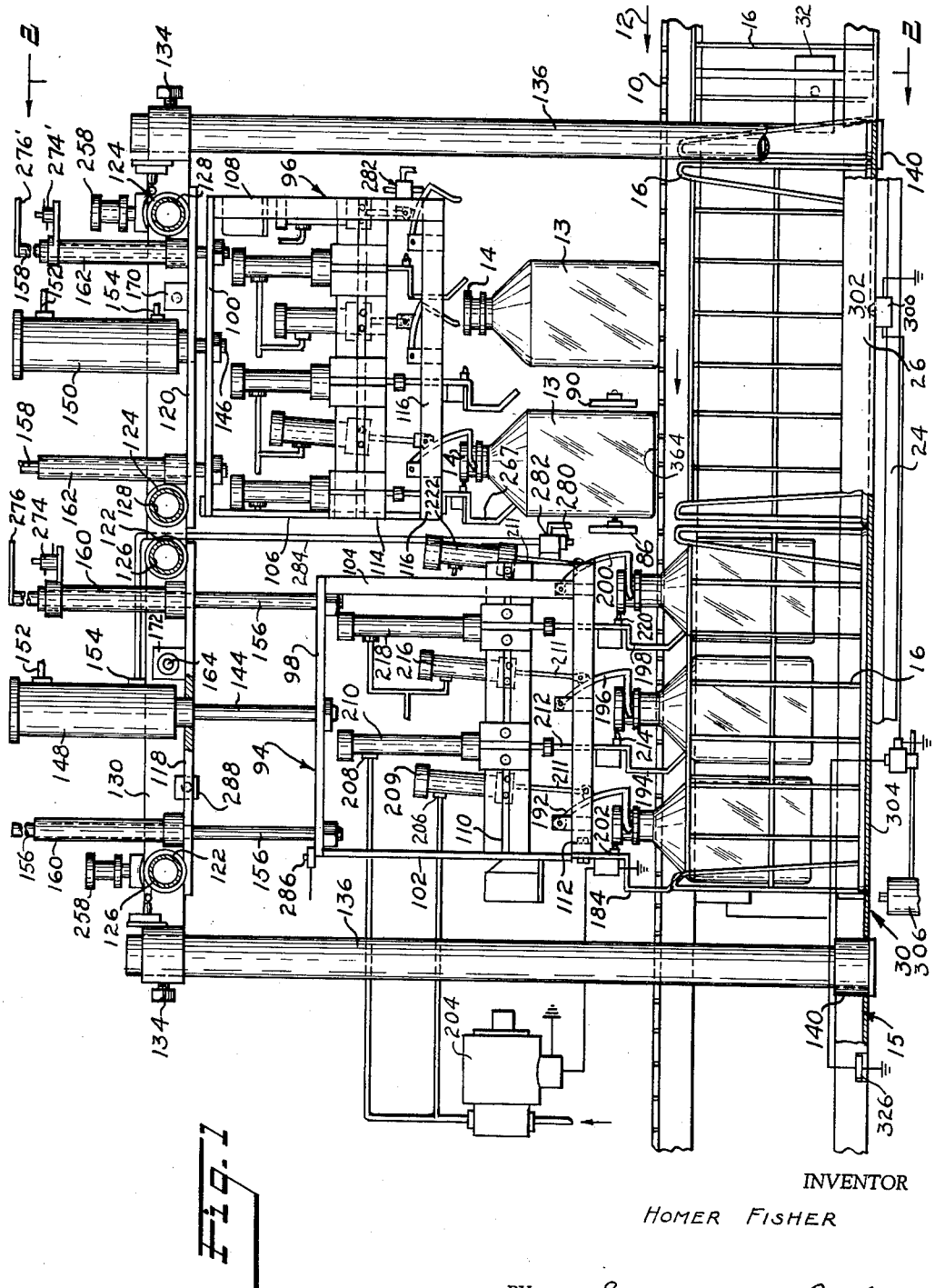

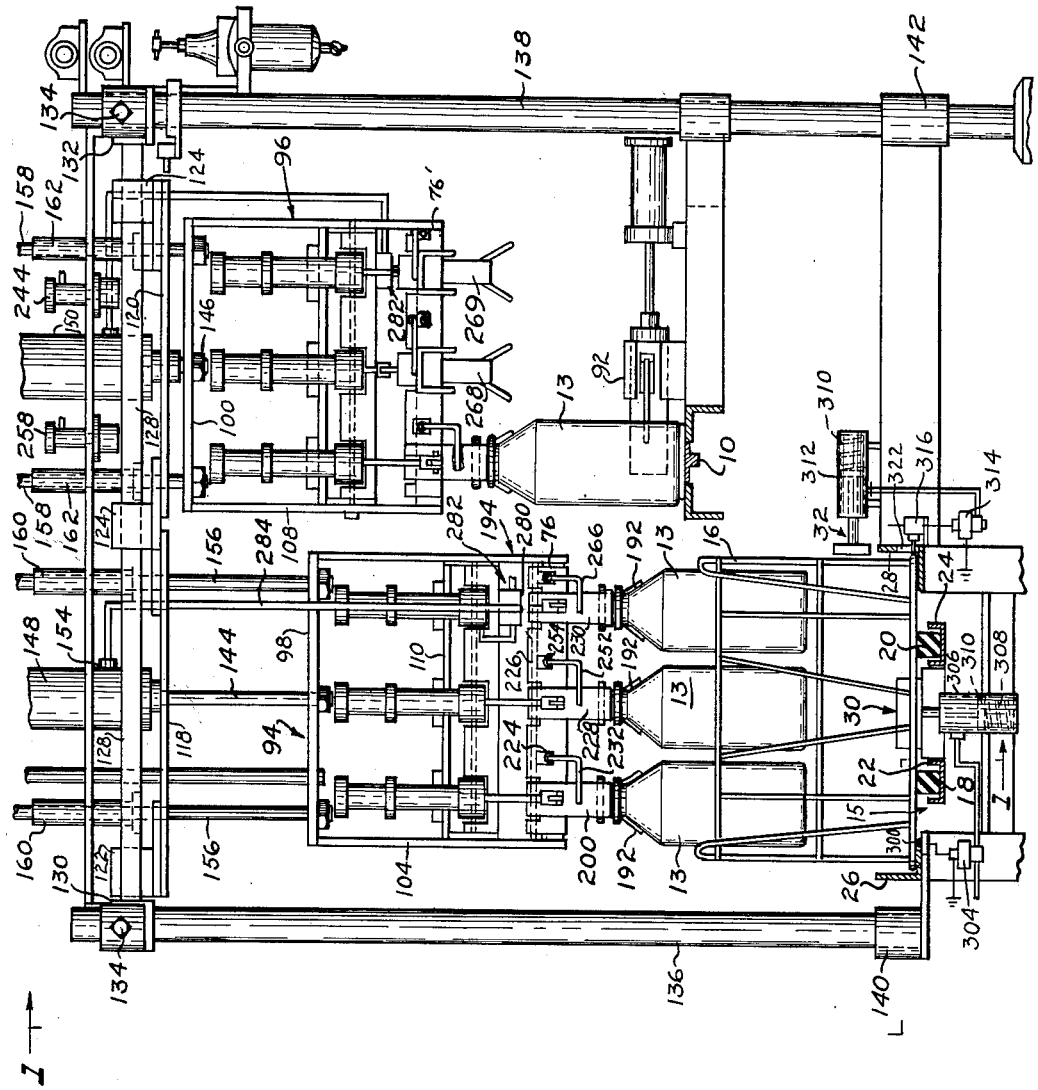

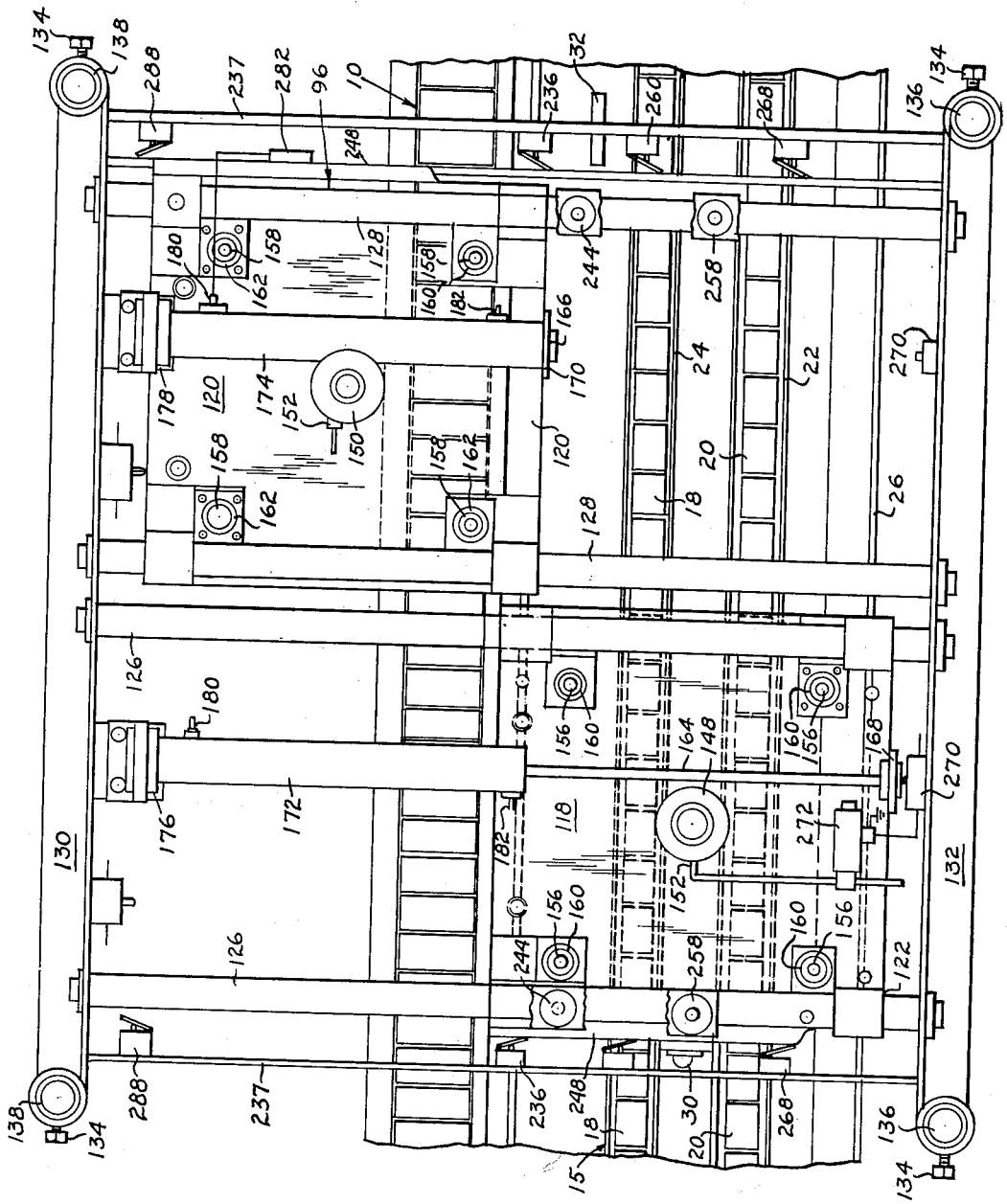

United States Patent Office 3,123,956
Patented Mar. 10, 1964

3,123,956
BOTTLE CASING APPARATUS AND METHOD
Homer Fisher, 413 Archdale Ave., Cuyahoga Falls, Ohio, assignor of one-half to Ivan H. Groom, Tallmadge, Ohio
Filed Nov. 20, 1961, Ser. No. 155,233
18 Claims. (Cl. 53—35)

This invention relates to method and apparatus for placing bottles into cases and more particularly to a method and apparatus for depositing in groups bottles delivered to said apparatus in a continuous single file.

The problem of transferring filled bottles, particularly those of the gallon or half gallon size in which milk is frequently packaged, from a conveyor belt on which the bottles are conveyed to the casing station in a single file, to multi-compartment cases where said compartments are arranged in a plurality of side-by-side rows has heretofore been difficult of solution. In order to accomplish automatic case loading, particularly for bottles of relatively large size, the prior art has resorted almost invariably to some means for marshalling the bottles from the single file into groups corresponding to the number and position of the compartments in the cases. In most instances the marshalling means has depended upon changing the direction of travel of the single file of bottles by moving the bottles one against the other in abutting relationship into a circular guideway having a plurality of outlets at right angles to the single file of bottles, the number of outlets being equal to the number of rows in the cases to be filled. It will be apparent that in an arrangement of this nature the possibility of the bottles becoming cocked, if they are of the square or rectangular variety, in the circular guideway is likely so that the bottles become jammed without feeding through the outlets and unless the entire bottling equipment serving the single conveyor is instantly stopped the bottles rapidly pile one upon the other causing considerable breakage and loss of product.

Not only are prior art case loading machines subject to the foregoing disadvantage, but the marshalling means requires the use of a considerable amount of space, which is usually at a premium in a bottling plant and such machines have usually required the use of expensive mechanism subject to frequent breakdown and consequent slowing down of plant output.

It is a broad object of the present invention to provide a method and apparatus which eliminates the difficulties and disadvantages of prior automatic case loading methods and machines.

More specifically, another object of the present invention is to provide a case loading machine which is adapted for use with single file bottle conveying means yet which eliminates entirely the need for complex, space-wasting marshalling means.

It is still another object of the invention to provide an automatic case loading mechanism which is inexpensive to construct and is adapted, with substantially no alteration, to use with existing equipment in any plant which presently conveys bottles to a casing station by way of single file conveyor belt means.

It is yet another object of the invention to provide an automatic case loading machine which eliminates the necessity for bottles ever coming into abutting engagement with each other but which, conversely, does not require that bottles be spaced an exact distance from each other on the conveying means in order to effect proper delivery of the bottles into their cases.

More specifically, it is an object of the present invention to provide apparatus which accomplishes the foregoing object by means of bottle grippers arranged over a conveyor in a pattern corresponding to the compartments in a case, said grippers being sequentially extensible from the downstream toward the upstream ends of each row of grippers into the conveyor path to grip successive bottles as they arrive in gripping position, each upstream gripper being conditioned for gripping in response to the operation of the preceding gripper, means being provided for moving an entire group of gripped bottles first laterally clear of the conveyor and then vertically into laterally positioned cases.

Other objects and their intended advantages will become apparent as the following detailed description is read in conjunction with the accompanying drawings wherein:

FIG. 1 is a vertical side elevation of the case loading mechanism of the present invention taken substantially on the line 1—1 of FIG. 2.

FIG. 2 is a vertical cross-sectional view taken substantially on the line 2—2 of FIG. 1, but showing the last gripper of the first row of grippers of a second set thereof moved to gripping position.

FIG. 3 is a top plan view of the loader of the invention.

FIG. 4 is a broken, reduced end elevation of a part of one carriage of the present invention.

FIG. 7 is a schematic view showing one means for controlling the movement of the bottle cases into and out of their loading station.

FIG. 8 is an enlarged broken side elevation of a part of a carriage of the invention with certain parts eliminated for purposes of clarity, showing an optional safety means which may be employed with the mechanism of the invention; and FIG. 9 is a vertical cross sectional view taken substantially on the line 9—9 of FIG. 8.

Figure 5:
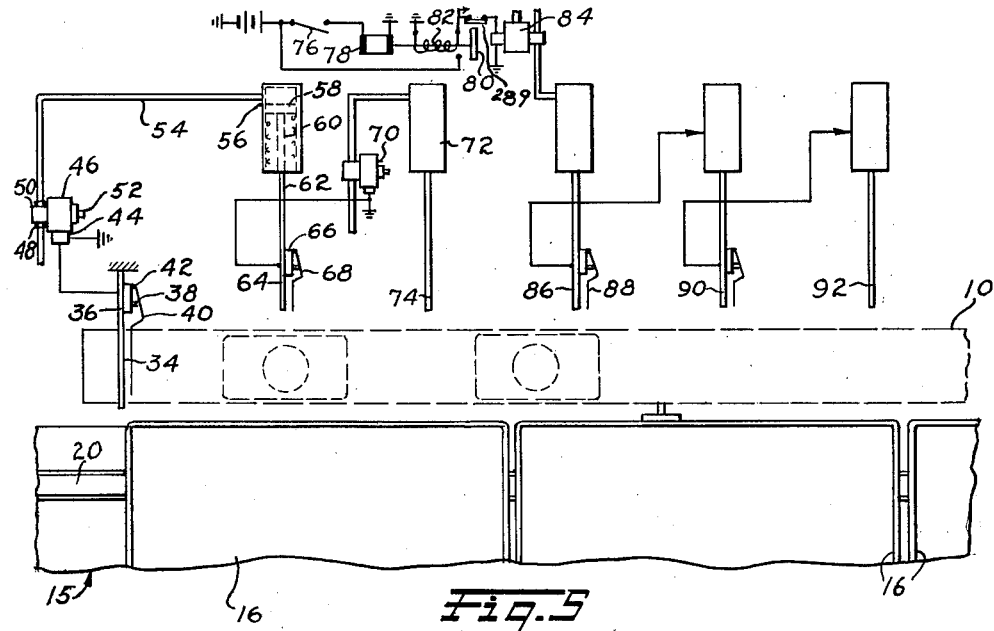
FIG. 5 is a schematic top plan view illustrating certain other features of the invention.

Referring now to the drawings and particularly to FIGS. 1 and 2 thereof, the mechanism of the invention comprises two or more (two being illustrated) carriage members each having a plurality of bottle clamping or gripper means which are arranged in groups within each carriage member corresponding to the number and position of the compartments in a case which is to receive filled bottles. For purposes of illustration only, the loader of the invention is shown and described herein as adapted for use with a three-row, nine compartment case for half-gallon milk jugs, though it will be quite apparent that with suitable modifications the invention may be used with any type bottle and with any multi-compartment case employed in the trade. The arrangement of the invention is such that when one set of clamping means of one carriage is engaged in a bottle pick-up operation the other means is engaged in depositing a group of bottles into a case, and vice-versa.

As will appear from the following detailed description, the power means for the invention is shown and described as comprising a plurality of pneumatically operated reciprocatory motors which are operatively controlled, usually, by solenoid valves though in some instances by pneumatic pilot valves, all of which are energized by impact of a moving element, such as a bottle, or a part of the carriage itself, with an electric switch or with the pilot valve itself. The elements related to or associated with each carriage are usually identical on both but generally only the element for one carriage will be described, this description serving for both carriages, and except where specifically noted, the identical elements of both carriages receive the same reference numerals.

It should be fully understood that the invention is not limited to the use of the pneumatic motors, solenoid valves and micro switches shown and described since it will be apparent to those skilled in the art that equivalent structure could be readily substituted. However, the various elements shown and described herein are all readily available commercially and casing machinery already constructed in accordance with the invention and employing the described elements, has performed with complete satisfaction for casing half-gallon milk jugs delivered to the machine at the rate of 130 bottles per minute.

In FIG. 1, the numeral 10 designates a conveyor belt of conventional construction which is traveling in the direction of the arrow 12 and carries thereon in single file a plurality of previously filled bottles 13, each of which has a lip 14 around the opening thereof. Parallel to the conveyor belt 10 but on a lower level is a second conveyor belt means 15 for the bottle cases 16, which are of conventional wire mesh construction, said conveyer means preferably comprising a pair of laterally spaced endless flexible elements 18, 20 (see FIG. 2) which are driven in unison by suitable drive means (not shown) through longitudinal U-shaped channel members 22, 24 whose side walls have a heighth substantially less than the vertical thickness of the flexible members 18, 20 whereby the cases are supported on the top surfaces of the flexible elements out of contact with the side walls of the channel members 22, 24. In order to prevent the cases from sliding laterally off of the conveying elements a pair of longitudinal opposed, laterally spaced, L-shaped channel members 26, 28 extend in parallel relationship to the elements 18, 20 with the vertical sides of the channels preventing accidental lateral shifting of the cases as will be obvious in FIG. 2.

As will be fully explained hereinafter, when a pair of cases arrives at the loading station, there is automatically extended into their path of movement between the flexible elements a retractable stop means indicated generally by the numeral 30 in FIGS. 1 and 2, the stop means serving to retain the cases at the loading station until both cases have been loaded. During the loading process the flexible elements continue to move uninterruptedly beneath the cases and in engagement therewith but without danger of becoming overheated by friction because of the relatively slow speed and substantial length of the conveying elements. After both cases at the loading station are filled, the stop means 30 is automatically retracted so that the filled cases then move off with the conveyor belt and are replaced by another pair of cases which are restrained in loading position by the stop means again being extended into the path of movement of the cases.

During operation, the case conveyor 15 will be loaded, substantially along its entire length, with a single file of cases and it will be obvious that when the two cases at the loading station are stopped by member 30, the entire column of cases on the conveyor belt must also stop. After a loading operation and while the filled cases are moving off, means must be provided for restraining the column of empty cases until the two previously loaded cases have moved clear of the loading station whereupon the column of empties advances until two more cases are in loading position. One means for effecting the temporary restraint of the column of empty cases may comprise a laterally extensible and retractable clamping element indicated generally by the numeral 32 in FIGS. 1 and 2, the clamping element being extended in proper timed relationship as will become apparent hereinafter against the side of the foremost empty case which is next to be advanced to loading position. When the clamping means 32 is extended it pushes the empty case slightly to the left in FIG. 2 into tight frictional engagement with the vertical side wall of the channel 26 thus preventing movement of the column of empties until the filled cases have moved clear whereupon restraining clamp member 32 is automatically retracted and the entire column of empties advances until the foremost thereof engages the just-previously extended stop member 30.

With particular reference now to FIG. 5, it will be noted that on the left hand side thereof there extends across the bottle conveyor belt 10 a fixed bottlestop arm 34 which is in the path of movement of the file of bottles traveling on the belt 10. Attached to the inner end of the arm 34 inwardly clear of the belt 10 is a conventional normally open micro switch 36 which is moved to closed position by the inward depression of a switch actuating plunger 38 over which there is a pivoted spring lever 40 extending into the path of advancing bottles in front of the stop arm 34. When the lead bottle in the file engages the lever 40 it is moved to the left so as to bear against plunger 38 and move the micro switch to closed position thereby energizing a solenoid 44 of a solenoid operated valve 46 having an inlet port 48 connected to a source of fluid pressure (not shown) an outlet port 50 and an exhaust port 52. The solenoid valve is of entirely conventional construction and is therefore not illustrated in detail it being understood that when the solenoid 44 is de-energized the inlet port 48 is disconnected from the outlet port 50 and the latter is connected to the exhaust port 52. When the solenoid is energized the inlet and outlet ports are connected while simultaneously the latter is disconnected from the exhaust port. Connected to the outlet port 50 is a conduit 54 leading to the upper end of a conventional fluid pressure motor 56, containing piston member 58, which is normally urged by a spring 60 to the retracted position of the drawing, it being understood that when fluid pressure is admitted to the upper side of the piston the latter moves downwardly causing the piston rod 62 thereof to move an integrally connected arm 64 into the path of advancing bottles. Connected to the arm 64 is a second micro switch 66 which is identical in all respects to the switch 36 and is provided with a similar pivoted switch operating arm 68 which, when engaged by the second most bottle is closed to energize a second solenoid valve 70, identical to valve 46, which when energized serves to admit fluid pressure to the upper end of a second fluid pressure motor 72 to cause a bottle stop arm 74 to be moved into the path of the third most bottle.

Each of the three arms 34, 64, 74 serve to stop sequentially the advancing bottles and as will become apparent hereinafter as each bottle is stopped by its respective arm other mechanism to be described operates to grip the first three bottles sequentially and then to move these together laterally clear of the belt and at the same time clear of the micro switch operating arms 40, 68 so that the solenoid valves 46, 70 are de-energized thereby permitting the springs of the fluid pressure motors 56, 72 to move the bottle stop arms 64, 74 to the retracted position of FIG. 5. When the fourth bottle contacts the micro switch 40 of the fixed bottle stop arm 34 the sequence described above is repeated for the fifth and sixth bottles with the entire sequence, including the pickup and removal of the fourth, fifth, and sixth bottles being repeated until the ninth bottle has engaged the bottle stop arm 74 whereupon separate switch means, indicated generally at 76 and described in detail hereinafter, is closed to effect a sequence of events which includes the deposit of the first nine bottles in their case while simultaneously a relay 78 is energized to close a switch 80 which in turn is provided with a holding coil 82 to retain the switch 80 in closed position even after the switch 76 is opened to effect, among other things, energization of a solenoid valve 84 to cause extension of a bottle stop arm 86 into the path of the tenth bottle that is to say, the first bottle for the second set of gripper means. Because the switch 80 is retained in closed position, the bottle stop arm 86 and the micro switch 88 carried thereby remains in the path of the advancing bottles until the second set of clamping means has received all of its supply of nine bottles with the arm 86 functioning exactly as did the fixed arm 34 for the first set of clamping means. Thus, when the micro switch 88 moves to closed position upon impact by the tenth, thirteenth, and sixteenth bottles the bottle stop arms 90, 92 are sequentially extended exactly as had been the arms 64, 74 already described. In addition to effecting extension of the bottle stop arm 86, the switch 80 also energizes electrical circuitry for the second set of clamping means as will become apparent hereinafter.

The sequentially operated clamping or gripper means for each group of nine bottles are carried respectively on a pair of carriage members generally designated by the numerals 94, 96, particularly illustrated in FIGS. 1 and 2 and 3. Each carriage member is capable of independent lateral and vertical movement and each carries as many sets of clamping or bottle gripper means as there are compartments in the cases to be filled, with the sets being arranged in rows corresponding to the pattern of the compartments in the cases.

With particular reference now to FIGS. 1 and 2, the carriages may comprise open framed structures of generally cubicle configuration having respective top plates 98, 100 to the corners of which there may be affixed by welding or the like vertical frame members 102, 104 in the case of carriage 94, and 106, 108 in the case of carriage 96. Attached to the frame members 102, 104 and 106, 108 of each carriage are a plurality of lateral and vertically spaced horizontal support members 110, 112 and 114, 116 respectively which are adapted to have affixed thereto bottle clamping mechanism hereinafter described in detail.

The carriages 94, 96 are suspended from respective horizontal plates 118, 120 having fixed to their upper side edges suitable pairs of bearing members 122, 124 which are slidably received on horizontal shafts 126, 128 extending laterally between a pair of longitudinally extending horizontal frame members 130, 132 which are disposed a substantial distance laterally beyond both conveyor belt means as clearly seen in FIG. 3. The members 130, 132 are adjustably connected by means of suitable collars and set screws 134 to vertical standards 136, 138 whose lower ends are fixed in suitable bracket members 140, 142 which may be fixed by any suitable means to an appropriate supporting foundation.

The carriages are connected with their respective horizontal plates 118, 120 by means of piston rods 144, 146 which are movable vertically into an out of double acting fluid motors 148, 150 fixed centrally to the upper side of the respective plates 118, 120 as best shown in FIG. 1. It will be apparent to those skilled in the art that when fluid pressure is admitted to the upper ports 152 of the motors the respective piston rods 144, 146 will be extended and the carriages will be lowered and, conversely, when fluid pressure is admitted to the lower ports 154 of the motors and exhausted from the upper ports 152, the piston rods 144, 146 will be retracted vertically upwardly and the carriages will be raised. In order to prevent the carriages from accidently turning about the vertical axis of the piston rod 144, 146 both carriages have fixed to their respective plates 98, 100 a plurality of vertical guide rods 156, 158 which are slidably received in upstanding sleeves 160, 162 fixed in any convenient manner to the upper surfaces of the horizontal support plates 118, 120 as shown.

With particular reference to FIG. 3, the plates 118, 120 are movable laterally to effect movement of the respective carriages between their bottle receiving and bottle loading positions by means of horizontal piston rods 164, 166 whose outer ends are connected by suitable lock nuts to upstanding ears 168, 170 fixed to the outermost edges of the respective support plates 118, 120. The piston rods 164, 166 are movable into and out of respective double acting fluid motors 172, 174 whose inner ends are fixed to suitable brackets 176, 178 fixed in any convenient manner to the horizontal, longitudinal frame member 130.

It will be apparent that when fluid pressure is admitted to the inner ports 180 of the motors 172, 174 the rods 164, 166 and hence the carriages 94, 96 will be moved laterally toward the case conveying belt means 18, 20 and when fluid pressure is admitted to the outer ports 182 and simultaneously exhausted from the inner ports 180 the piston rods 164, 166 will be retracted and the carriages moved in the direction of the bottle conveyor belt 10.

As has been previously mentioned, each carriage carries sets of bottle clamping means, each of which comprises two elements namely, a bottle positioning arm and a bottle clamp which is adapted to engage the neck of the bottle after the bottle has come into contact both with its hereinbefore described bottle stop arm and the just-mentioned bottle positioning arm. With particular reference to the carriage 94 as shown in FIG. 1, the bottle positioning arm of the first bottle is designated by the numeral 184 and as illustrated in FIG. 4 the positioning arm 184 for the first bottle as well as the positioning arms 186, 188 for the fourth and seventh bottles are non-retractably fixed to a laterally extending cross member 190 and, depending upon the lateral position of the carriage each of the fixed position arms extends into the path of the advancing bottles with each arm being provided with a pair of outwardly diverging rod members 191 which partially embrace the front upper part of the bottle so that the positioning arm in conjunction with the bottle stop arm 34 firmly supports and positions the bottle for subsequent engagement by its clamp which, in the case of the first bottle, is designated by the numeral 192 in FIG. 1.

Each of the positioning arms except those for the first, fourth, and seventh bottles as well as all of the bottle clamps of both carriages must be maintained in a raised position to provide clearance for the preceding bottles as they pass therebeneath to their clamping positions. Thus, after the first bottle has moved into engagement with its positioning arm 184, in accordance with the invention, means are provided for moving its clamp automatically around the neck of the bottle and simultaneously the normally raised positioning arm 194 for the second bottle is automatically lowered in readiness to be engaged by the second bottle whereupon its clamp 196 is moved to clamping position and simultaneously the positioning arm 198 for the third bottle is lowered into the path of the latter and as soon as the arm 198 is engaged by the third bottle its clamp 200 is lowered to clamping position.

The means for lowering the clamps and positioning arms are best illustrated in the schematic circuit portion of FIG. 1 where it will be noted that adjacent the upper end of the positioning arm 184 there is disposed a normally open micro switch 202 which, when engaged by the neck of the first bottle, is closed to complete a circuit to a solenoid valve 204 which is identical in all respects to the previously described valve 46 and when energized admits fluid pressure to the inlet ports 206, 208 of a pair of single-acting fluid motors 209, 210 which are normally retained in retracted position by spring force, and whose piston rods 211, 212 are connected to the clamp 192 and to the positioning arm 194 respectively so that the latter members are moved downwardly to clamp the first bottle and be in the path of the next advancing bottle. The positioning arm 194 is likewise provided with a micro switch 214 which upon engagement by the second bottle energizes yet another solenoid valve (not shown for purposes of clarity) which admits fluid pressure to a pair of fluid motors 216, 218 which serve to lower the clamp 196 about the neck of the second bottle and to lower the positioning arm 198 into the path of the third approaching bottle. A third micro switch 220 is carried by the positioning arm 198 and when this is engaged by the third bottle it serves to energize a third solenoid valve to admit fluid pressure to a fluid motor 222 to cause the third bottle clamp 200 to be moved into clamping position.

Figure 6:
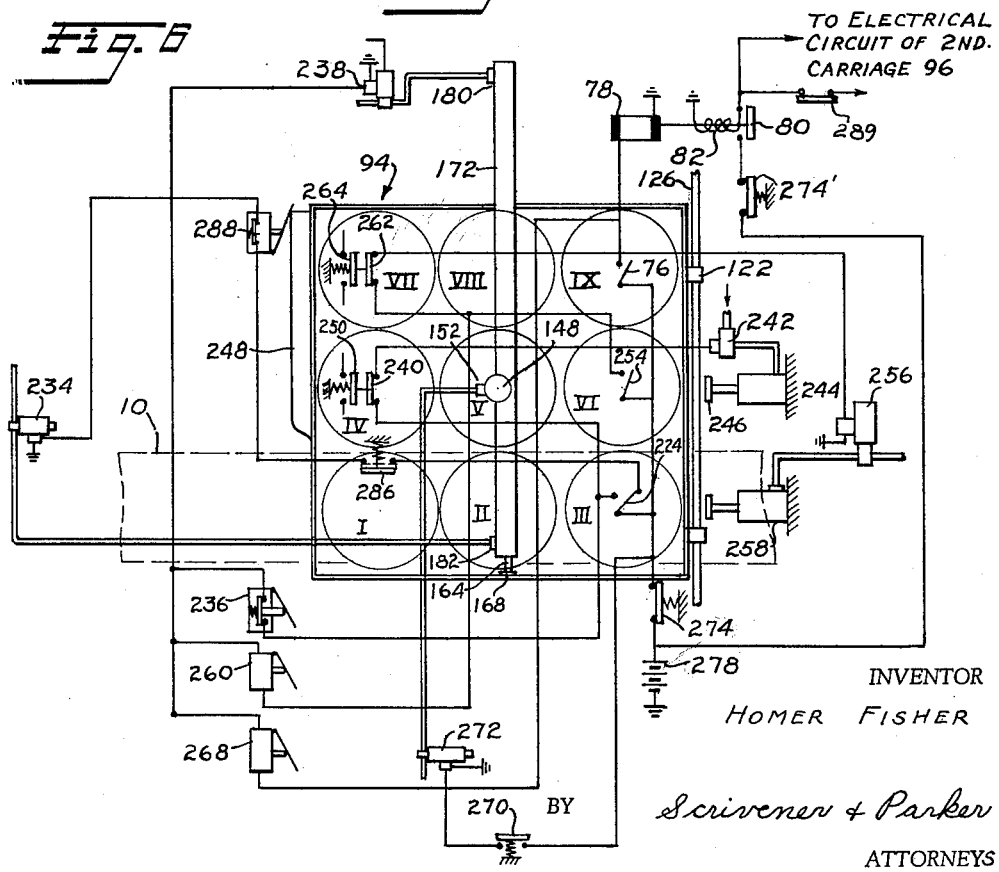
FIG. 6 is a schematic top plan view illustrating certain other features of the invention.

After the first three bottles have been clamped as above described it is now necessary to move the carriage laterally so that the second row of positioning arms and clamps is in alignment with the advancing file of bottles. Though those skilled in the art will recognize that this may be done in a variety of ways, a preferred means is by the provision of switch means engageable by the third bottle clamp only after the clamp has engaged the bottle neck, thus insuring that all of the bottles will be firmly grasped prior to being moved laterally clear of the conveyor belt 10. With particular reference to FIGS. 2 and 6 the switch means for effecting lateral movement of the carriage may comprise a micro switch 224, mounted on a horizontal cross member 226 which pivotally supports the bottle clamps 200, 228, 230 for the last bottles in each row, that is to say, for the third, sixth and ninth bottles of the group which is to be transferred to a case. Carried on the clamp 200 is a switch operating arm 232 which, when the clamp is moved downwardly about a bottle engages the switch 224 to move it from its normal position as shown schematically in FIG. 6 to a second position to effect lateral movement of the carriage sufficient to bring the second row of clamping means in alignment with the conveyor belt 10 as will now be described.

In FIG. 6, each set of clamping means on carriage 94 is defined, for purposes of illustration only, by a circle each of which bears a Roman numeral corresponding to the number of the bottles which would be successively clamped by the respective sets of clamping means. The switch 224 which is engaged by the clamp 200 for the third bottle is of the double-throw variety which, in its normal position of FIG. 6, energizes a solenoid valve 234 which serves to admit fluid pressure to the outer port 182 of the previously described lateral-movement motor 172. When the switch 224 is moved to its second position in response to movement of the third bottle clamp 200 to clamping position, the circuit to solenoid valve 234 is broken thereby exhausting fluid pressure from port 182 of motor 172 and a circuit is completed through a normally closed switch 236 carried on a suitable lateral cross member 237 (see FIG. 3) to a solenoid valve 238 which when energized admits fluid pressure to the upper port 180 of motor 172 so as to cause the piston of motor 172 and hence the carriage 94 to commence movement in a lateral direction. It will be noted that when switch 224 is moved to its second position it also energizes through a normally closed switch 240 a solenoid valve 242 which admits fluid pressure to a single acting motor 244 carrying a limit stop member 246 movable into the path of an abutment carried on the carriage 94 which abutment may comprise one of the previously described bearing members 122 slidably received on the transverse horizontal shaft 126 shown in FIGS. 1 through 3. The purpose of the limit stop 246 is to prevent the carriage from overshooting the conveyor 10 and assures that the carriage is stopped with the second row of clamping means in proper alignment with the conveyor. The carriage carries on one side or in any other appropriate position a cam means 248 which, when the carriage has been stopped in the second transverse position by means of the limit stop 246, engages suitable actuating means for the switch 236 to move this to open position thereby de-energizing solenoid valve 238 so as to connect the port 180 of motor 172 to atmosphere.

With the second row of clamping means for the fourth, fifth, and sixth bottles now in alignment with the conveyor belt, when the fourth bottle contacts the switch 240 which corresponds in position to the previously described switch 202 on the bottle positioning arm 184 for the first bottle, the latter, being of the double throw variety, is moved from the position of FIG. 6 wherein the solenoid valve 242 for the limits stop motor 244 is energized to a position breaking the circuit to valve 242, thus causing the limit stop 246 to be retracted, while at the same time second switch means 250 integrally connected with switch 240 for simultaneous movement therewith is moved to closed position to energize a solenoid valve (not shown for purposes of clarity) which serves to admit fluid pressure to the motors for the fourth bottle clamp and the bottle positioning arm for the fifth bottle to move these members downwardly exactly as has already been described for the corresponding members for the first and second bottles.

The sequence of operation for clamping the fourth, fifth, and sixth bottles is identical to that already described for the first, second, and third bottles and when the clamp 228 shown in FIG. 2 for the sixth bottle is moved into clamping position an arm 252 is moved into engagement with a normally open micro switch 254, shown schematically in FIG. 6, to move this to a closed position thereby energizing a solenoid valve 256 causing a second limit stop motor 258 to be moved into the path of the bearing member 122 so that when fluid pressure is admitted to the transverse moving motor 172, also in response to the closing of switch 254, the carriage will again be stopped with the third row of bottle clamps in precise alignment with the conveyor belt 10. As before, the solenoid valve 238 for admitting fluid pressure to motor 172 is energized through a normally closed switch 260 which is moved to opened position when engaged by the cam means 248 after the carriage has arrived at its third loading position.

When the seventh bottle engages the micro switch 262, corresponding to the switches 240, 202 already described, the switch 262 is moved to open position and simultaneously a switch element 264 is moved to closed position to effect retraction of the limit stop motor 258 and lowering of both the clamp for the seventh bottle and the bottle positioning arm for the eighth bottle. After the eighth and ninth bottles have been clamped as previously described, an arm 266 on the ninth bottle clamp 230, as shown in FIG. 2, is moved into engagement with the normally open switch 76 which is shown schematically in FIG. 6 and has been previously mentioned in connection with FIG. 5. When switch 76 is moved to closed position it effects, first, energization of solenoid valve 238 to admit fluid pressure to transverse moving motor 172 to cause carriage 94 with its group of nine clamped bottles to be moved transversely entirely clear of conveyor 10 with all of the bottles being suspended over the corresponding compartments of a case in readiness to be lowered thereinto as will be hereinafter described.

In addition to effecting transverse movement of carriage 94 as above described, the switch 76 also energizes relay 78 as previously described in connection with FIG. 5 so that all of the elements of the second carriage 96 function exactly as described for the corresponding elements of the carriage 94 except that the fluid motors for the positioning arms 267 (FIG. 1) and 268, 269 (FIG. 2) for the first, fourth and seventh bottles of the second carriage are in normally raised position and immediately upon closure of switch 80 a single solenoid valve is energized to admit fluid pressure simultaneously to the mentioned three positioning arm motors thereby lowering the positioning arms (note arms 268, 269 in FIG. 2) which thereafter remain in lowered position throughout the bottle clamping operation of the second carriage. It is not believed that any further description of the operation of carriage 96 is required except to state that until switch 76 is closed by the ninth bottle of the first carriage 94, the second carriage 96 is idle and occupies the inner position as shown in FIG. 3.

Referring now to the continued operation of carriage 94, after it has been moved to its transverse position clear of the conveyor belt 10 and in readiness for lowering into a waiting case, as the carriage approaches this position the cam 248 engages a micro switch 268 which opens the circuit to the solenoid valve 238 again exhausting operating pressure from the transverse moving cylinder 172. At the same time and with reference to FIGS. 3 and 6 the end of the piston rod 164 of the transverse moving piston 72 contacts a micro switch 270 energizing a solenoid valve 272 which when open admits fluid pressure to the upper inlet port 152 of the previously described lowering piston 148 to cause the carriage to move downwardly in the direction of the previously positioned case. As the bottles engage the bottom of the case a switch 274, which is shown schematically in FIG. 6 and in an actual preferred position in FIG. 1 at the upper end of one of the guide sleeves 160, is engaged by a suitable projection which may be a cam or any other suitable means and in FIG. 1 is shown as an arm 276 fixed to the upper end of the guide rod 156 which is slidable in the sleeve 160. As will be apparent from an inspection of FIG. 6, the switch 274 is moved to open position, it de-energizes all of the electrical circuitry for the carriage 94. Thus, when the switch 274 is open all of the previously energized solenoid valves are opened thereby exhausting fluid pressure from all of the clamp and positioning arm motors so that each of these is moved by spring force to its normally retracted position.

When the clamp 230 for the ninth bottle (see FIG. 1) is moved to its fully raised position it engages a plunger 280 of a conventional pilot valve 282 having inlet, outlet and exhaust ports the arrangement being such that when the plunger 280 is in an extended position the inlet and outlet ports are disconnected while the latter is connected to the exhaust port and when the plunger is pushed inwardly the inlet and outlet ports are connected and the latter is disconnected from the exhaust ports. Thus, when the clamp 230 is raised so as to move the plunger 280 inwardly, fluid pressure is admitted from the source to a conduit 284 leading to the lower port 154 of the lowering motor 148 thereby causing the piston rod 144 and hence the carriage 94 to be raised upwardly above the conveyor 10 in readiness to be moved back to its initial bottle receiving or battery position. Because the ninth bottle clamp had been moved away from the valve plunger 280 of valve 282 before the carriage had been moved laterally to its lowering position, and because the carriage is maintained elevated solely by the pressure supplied through valve 282 to the lower end of the lowering motor 148, in order to prevent the carriage from prematurely descending under the force of gravity until it is properly positioned over the case, the exhaust port of valve 282 may be provided with a restriction which retains sufficient pressure beneath the lowering motor piston to retain the carriage raised until moved fully to the left in FIG. 1, by which time the pressure in motor 148 has bled to atmospheric level thereby permitting the carriage to be lowered as explained.

Return movement of the carriage is controlled by a normally open switch 286 which is shown schematically in FIG. 6 (note that as soon as carriage 94 commenced its upward movement, switch 274 closed to again re-energize the circuitry of carriage 94) as being serially interposed between the bottle operated switch 224 and the solenoid valve 234 which controls the flow of fluid pressure to and from the return port 182 of the lateral carriage positioning motor 172. As illustrated in FIG. 1 the switch 286 is mounted atop the upper plate 98 of the carriage 94 and when the carriage is in its fully raised position the switch engages the lower surface of the upper carriage support plate 118 and is moved to closed position thereby energizing solenoid valve 234 (the switch 224 having moved automatically to the position of FIG. 6 upon release of the third bottle) to admit fluid pressure to the port 182 thereby returning the carriage to its inner position corresponding to the position of FIG. 6 upon release of the third bottle to admit fluid pressure to the port 182 thereby returning the carriage to its inner position corresponding to the position of the second carriage 96 as shown in FIG. 2. If desired, another normally closed switch 288 may be serially interposed between the switch 286 and the solenoid valve 234 with the switch 288 being mounted on the member 236 in the path of the cam surface 248 (see FIG. 3) so that when the latter is moved fully inwardly the switch 288 is contacted and moved to open position thereby de-energizing solenoid valve 234 and thus exhausting all fluid pressure from the lateral positioning motor 172.

As has been previously explained after the ninth bottle of the first carriage 94 has been clamped, the electrical circuitry of the second carriage 96 is energized by the closing and retention in closed position of the switch 80 shown in FIG. 6. Immediately upon energization of the second carriage the first three downstream positioning arms are moved to their lowered positions and the second carriage proceeds to clamp its supply of nine bottles exactly as already explained for the carriage 94 with all of the bottles being received by the second carriage 96 during the period when the first carriage is occupied in lowering and releasing its bottles into its adjacent case and in returning to battery position. It should be noted that when the last gripper of the second carriage has been moved to gripping position it moves a normally closed switch 289 (see FIG. 5) (this may be connected to the switch 76' of the last gripper of the second carriage) for de-energizing the solenoid valve 84 which has normally effected retention of the bottle stop arm 86 in extended position during operation of the second carriage. It is essential that this be retracted clear of the path as soon as all of the grippers of the second carriage have received their bottles in order that the next bottle i.e. the ninth and tenth bottle, can now travel along the conveyor path for gripping by the first gripper of the first carriage.

After the second carriage has deposited its supply of bottles into its adjacent case an arm 276' carried on guide rod 158 as shown in FIG. 1 engages a switch 274' which is normally closed, to move this to open position thereby de-energizing the holding coil 82 for the switch 80 permitting the latter to move to open position and de-energize the entire electrical circuit of the second carriage as will be immediately apparent upon an inspection of FIG. 6.

As soon as nine bottles of the second carriage have been moved clear of the conveyor belt then the next succeeding bottle moves past the second carriage and into engagement with the bottle stop 34 of the first carriage and simultaneously into engagement with the micro switch 202 on the first bottling positioning arm 184 to initiate a new bottle collection cycle for the first carriage.

After both of the cases at the loading station have been filled with bottles it is necessary to retract the case stop 30 while at the same time the case clamp 32 is extended thereby permitting the filled cases to be moved away while the entire train of empty cases is restrained until the first two cases are entirely clear of the loading station.

The foregoing may be accomplished in any of a variety of ways. For example, the case stop 30 may be retracted in response to the loading of the second case by the provision of a suitable weight responsive switch element 300 which may be attached beneath one of the channel members 26 as shown in FIGS. 1 and 2 and have extending through a suitable opening a switch actuating member 302 which is engaged by the bottom frame member of the second case and is spring loaded to the open position by spring means, shown schematically at 303 in FIG. 7, which is sufficiently strong to prevent closing of the switch 300 until such time as the complete load of filled bottles has been released into the second case whereupon the switch 300 is moved to closed position to energize a solenoid valve 304 to admit fluid pressure to the upper end of a fluid motor 306 which controls the movement of the case stop 30. As can be seen in FIG. 2 a spring 308 normally urges the stop 30 to the raised position of FIG. 2 but when fluid pressure is admitted to the upper end of the motor 306, piston 310 thereof is moved downwardly to retract the stop and permit the two loaded cases to be moved away from the loading station by the continuously moving conveying elements 18, 20.

As previously mentioned the case clamp 32 is extended outwardly against the leading empty case behind the two loading cases to permit them to move clear of the loading station and away from the leading empty case at least a sufficient distance to enable the case stop 30 to be re-extended into the path of empty cases without prematurely coming up beneath one of the filled cases being transported away from the loading station.

As can be seen in FIGS. 2 and 7 the case clamp 32 is normally urged by a spring 310 to clamping position but when fluid pressure is admitted to the outer end of the case clamp motor 312 the piston thereof is moved inwardly so as to move the case clamp away from the leading empty case. Fluid pressure is admitted to or exhausted from motor 312 under the control of a solenoid valve 314 which in turn is controlled by a normally closed switch 316 provided with a plunger 318 having extending thereover a switch actuating element 320 which may extend through a suitable opening 322 through the vertical side of the channel 28 shown in FIG. 2 so as to be engaged by the bottom frame of a case traveling on the case conveyor belts. When the actuating member 320 is engaged by a case the switch 316 is moved to the open position of FIG. 7 to de-energize valve 314 and enable clamp 32 to move to its extended clamping position under the influence of the spring 310.

To insure that the stop 30 is retained in its retracted position until the second filled case has passed therebeyond a second normally open switch 324 (see FIG. 7) is connected to one of the side channels beyond the loading station with the switch having an actuating arm 326 which is engageable by the lower side edges of the cases and is so disposed along the conveyor path that the arm 326 is engaged by the leading edge of the foremost loaded case before the second loaded case has moved clear of the weight responsive switch 300. Thus, before the second case has moved clear of the switch 300 the switch 324 is moved to closed position so that after the second case has moved clear of the switch 300 the solenoid valve 304 nevertheless continues to be energized so that fluid pressure continues to be admitted to the upper end of the case stop motor 306 to retain stop 30 in its retracted position until the rear edge of the second loaded case has moved clear of actuator 326 whereupon the switch 324 moves to open position to de-energize valve 304 and thus permit case stop 30 to move to its extended position in the path of the oncoming empty cases. At the instant the leading empty case engages the stop 30, it also desirably engages the actuating arm 320 of the switch 316 to move this to open position thereby de-energizing valve 314 and permitting case clamp 32 to extend into clamping engagement with the empty case which is now behind the two cases which are in loading position.

With reference now to FIGS. 8 and 9, the mounting means for the bottle clamp are shown in somewhat greater detail, with particular reference being made to an optional safety mechanism whose function is to prevent the premature dropping of clamp bottles in the event of either an unexpected loss of air pressure or of failure of electrical power. As shown in FIG. 8 the bottle clamp actuating motors 209, 216, 222 are pivotally connected by pivot pins 328 to the horizontal member 110 and the piston rods 211 of the motors are pivotally connected to the upper side of the clamps 192, 196, 198 by means of clevices 330 which embrace ears 332 integrally fixed to the clamps as shown. Each of the upper sides of the clevices afford a flat surface which can be engaged by the lower end of a catch member 334 which is freely pivoted adjacent its upper end to pin means 336 which may extend through the lower side of the motor casing as more clearly seen in FIG. 9 with the upper end of the catch members 334 having laterally deposed vertically extending arms 338 which are welded or otherwise fixed tangentially to bearing members 340, the connection of the arms with the bearing members being in substantial horizontal alignment with the axes of the latter, so that the normal tendency of the catch members 334 is to swing clockwise in FIG. 8 under the influence of gravity to engage the upper flat surfaces of the clevices 330 after the clamping members have been moved to clamping position. Now, should for some reason fluid pressure or electrical energy be interrupted prematurely it will be obvious from an inspection of FIG. 8 that the clamping members cannot be retracted because they afford an effective stop on the top surface of the clevices.

To insure that the catch members do not interfere with the normal retraction of the clamping member to release the bottles into the cases as previously described herein, means are provided for simultaneously rotating all of the catch members 334 contour clockwise in FIG. 8 just prior to the retraction of the clamping members. As shown in FIGS. 8 and 9 the means for accomplishing this comprises a solenoid 342 which is fixed as shown to one of the forward vertical members 102 of the carriage. The solenoid 342 has a plunger 344 which is normally urged by a spring 346 to its extended position. Attached to the end of the plunger 344 are rod means 348 which may be in two elongated parts 350, 352 (FIG. 9) joined to the plunger 344 by a lateral bar 354 with the elongated parts extending between the rows of fluid motors and having fixed thereto at appropriate intervals short lateral rods 356 which are adapted to engage above the axis of the pivot pins 336 upward extensions 358 integral with the vertical arms 338. It will be apparent that when the solenoid 342 is energized to retract the plunger 344 the rod means 348 is moved to the left in FIG. 8 to cause the lateral rods 356 to act on the upper extension 358 of the catch members to swing these counter clockwise in FIG. 8 clear of the upper sides of the clevices 330 so that the clamp means may be swung clear of the bottles.

To insure that the solenoid 342 is energized only just prior to or simultaneously with the deposit of the bottles into the bottom of the cases, the switches 274, 274', shown in FIG. 1, may be of the double throw variety so that when the switch is moved to open position to de-energize all of the solenoid valves of the respective carriages, simultaneously therewith each switch may complete the electrical circuit to the solenoid 342 so that as soon as this is energized and the catch members are moved to their release position, the clamps move rapidly clear of the bottles.

With reference now ot the clamping member structure as shown in FIG. 1 and more particularly in FIG. 8, it will be noted that the bifurcated part 360 of each clamp which embraces the upper end of a bottle beneath the lip 14 has a downturned forward part 362 which has an upward camming action on the bottles so that as the bottles are engaged by the clamp they are lifted bodily clear of the conveyor belt 10 as indicated at 364 in FIG. 1.

It is believed that the operation of the invention should be apparent from the foregoing description. Briefly, the invention affords a method, and apparatus for accomplishing the method of successively picking up bottles from an advancing single file with the bottles being arranged during the picking-up process in a pattern corresponding to the compartments in the bottle cases. In addition, after the cases at the loading station have been loaded the invention provides means for automatically moving the cases clear of the loading station and substituting therefor empty cases in readiness for loading. It will be apparent to those skilled in the art that the apparatus of the invention is susceptible of a variety of changes and modifications without however departing from the scope and spirit of the appended claims.

What is claimed is:

1. The method of loading bottles in groups in a case from an advancing single file of bottles disposed on a continuously moving conveyor comprising the steps of sequentially and separately clamping about the neck each of a series of bottles while in alignment on said conveyor and equal in number to the number of bottles in one row of a bottle case, moving the series of clamped bottles simultaneously laterally clear of the conveyor, repeating for each row in said case until the number of bottles equal to the number which can be received in a case have been clamped and moved clear of the conveyor, lowering the bottles into said case and thereafter releasing said bottles.

2. Apparatus for transferring bottles from a single file, continuously moving conveyor belt into an adjacent case comprising a carriage disposed over said conveyor, means for moving said carriage laterally and means for moving said carriage vertically with respect to said conveyor, a plurality of bottle grippers on said carriage arranged in rows corresponding to the bottle-receiving rows in said case, gripper operating means normally retaining said grippers in a raised position to permit the passage of bottles therebeneath but being operable to lower each gripper about the neck of a bottle, bottle stop means carried by said carriage and corresponding in number and position to said gripper means, means for moving said bottle stop means into the path of bottles sequentially, means responsive to engagement of each bottle stop means by a bottle for lowering a bottle gripper to gripping position and moving the next following bottle stop means into the path of movement of said bottles, means responsive to the movement of all the grippers to gripping position in each row for operating said lateral moving means in steps for aligning successive rows of grippers with said conveyor, means responsive to the movement of all the grippers in the last row for operating in sequence said laterally and vertically moving means to first effect movement of said carriage laterally clear of said conveyor and over said case and then lowering said carriage until the gripped bottles are disposed in said case, means responsive to the lowering of said bottles into said case for effecting movement of all of said grippers to their bottles releasing position, and means responsive to the last mentioned movement of said grippers for operating in sequence and vertically moving means and said laterally moving means for returning said carriage to a position wherein the first row of grippers is in alignment with said conveyor means.

3. The transfer apparatus of claim 2 including a second inactive carriage and means for supporting an empty case laterally of said second carriage, and means responsive to the movement of the last row of grippers of said first mentioned carriage to activate said second carriage to effect gripping of bottles and subsequent transfer to said second case.

4. In apparatus for transferring bottles from a single file continuously moving positively driven conveyor belt into an adjacent case comprising a carriage disposed over said conveyor, stop means extending into the conveyor path for engagement by the lead bottle on said conveyor, bottle gripper means movably connected to said carriage and adapted to be moved from a first raised position to a second lowered position for gripping the neck of a bottle in the direction of movement thereof on said conveyor, and means responsive to the engagement of said stop means by a bottle for effecting movement of said gripper means from its first to its second position to grip a bottle upon engagement thereof with said stop means.

5. The apparatus of claim 4 wherein said gripper means comprises a swingable element including a pair of bifurcated arms for grasping the neck of a bottle upon swinging movement of said gripper towards said bottle, and camming means integral with said arms for elevating said bottle clear of said conveyor belt as said gripper element moves fully into its bottle gripping position.

6. In apparatus for transferring bottles from a single file continuously moving positively driven conveyor belt into an adjacent case comprising a carriage disposed over said conveyor, stop means extending into the conveyor path for engagement by the lead bottle on said conveyor, bottle gripper means movably connected to said carriage and adapted to be moved from a first raised position to a second lowered position for gripping the neck of a bottle in the direction of movement thereof on said conveyor, means responsive to the engagement of said stop means by a bottle for effecting movement of said gripper means from its first to its second position to grip a bottle upon engagement thereof with said stop means, second bottle stop means spaced longitudinally along said conveyor in a direction opposite to the direction of travel of said bottles, operating means normally retaining said second stop means clear of said conveyor, and means responsive to engagement of said first bottle stop means by a bottle for extending said second bottle stop means into said conveyor path for engagement by the next succeeding bottle.

7. The apparatus of claim 6 including a second bottle gripper means, and means responsive to engagement of said second bottle stop means for moving said bottle gripper means to a position gripping the second bottle in the direction of movement thereof.

8. In apparatus for loading bottles in groups in a case from an advancing single file of bottles disposed on a continuously moving conveyor comprising a set of a plurality of separate bottle gripper means arranged in rows corresponding to the rows in a case, means for suspending said gripper means over said conveyor so that the outermost row thereof is in alignment with said conveyor, means successively responsive to the arrival of succeeding bottles beneath respective gripper means from the downstream towards the upstream ends of each row to effect sequential movement of the gripper means of a row to bottle gripping position, means responsive to the movement of all the gripper means of a row to gripping position for simultaneously moving all of said gripper means, laterally, to align successive rows of empty gripper means with said conveyor, means responsive to the movement of all the gripper means of the last row to gripping position for moving all of the gripper means laterally clear of said conveyor, means responsive to the last named movement for lowering the gripper means in the direction of a case and means for simultaneously releasing said gripper means and thereafter returning the same to their initial position when said bottles are positioned in said case.

9. In the apparatus of claim 8 including a second set of normally deactivated gripper means substantially identical to said first set of gripper means and disposed upstream of said first set with respect to said conveyor, and means responsive to the arrival of the last bottle into its gripping position with respect to said first set of gripper means for activating said second set of gripper means.

10. In the apparatus of claim 9 including means for delivering a pair of empty cases to a loading position laterally disposed with respect to said sets of gripping means, means responsive to the deposit of bottles in the second case for effecting movement of both of said cases away from said loading position, and means responsive to the movement of said cases away from the loading position for effecting movement of two additional cases into said loading position.

11. In the apparatus of claim 8 including means engageable with each of said gripper means upon movement to gripping position for preventing said gripper means from moving prematurely to non-gripping position, and means responsive to movement of the gripper means to bottle depositing position for effecting disengagement of said preventing means from said gripper means so as to enable the latter to return to non-gripping position.

12. Apparatus for transferring bottles from a single file continuously moving conveyor to cases at casing stations positioned laterally of said conveyor comprising a plurality of normally retracted gripper means arranged in lateral and longitudinal rows corresponding to the bottle receiving rows in said cases, laterally and vertically movable means for supporting and positioning said gripper means of said apparatus above said conveyor so that the longitudinal rows of gripper means are movable into alignment with said conveyor, bottle stop means normally extending into said conveyor path and lying substantially in a vertical plane through the downstream lateral row of said gripper means, normally retracted bottle stop means movable substantially in the vertical planes of each of the other lateral rows of gripper means, and means responsive to the engagement of each of said bottle stop means for extending the next upstream bottle stop means into the conveyor path and for simultaneously moving the gripper means above the bottle engaging each stop means into its bottle gripping position.

13. The apparatus of claim 12 wherein the first bottle stop means comprises a vertically extending bottle positioning arm and a laterally extending arm, and each of the other bottle stop means comprises a normally retracted vertically movable bottle positioning arm and a normally retracted laterally movable arm.

14. The apparatus of claim 13 including means responsive to the movement of all the gripper means of a longitudinal row to gripping position for effecting lateral movement of said support means a distance sufficient to align the next adjacent longitudinal row of gripper means with said conveyor path, and means responsive to the movement of gripped bottles away from said laterally movable stop arms for effecting retraction thereof.

15. Apparatus in accordance with claim 12 including means responsive to the movement of the last upstream gripper means of each longitudinal row for effecting lateral movement of said support means a distance substantially equal to the lateral spacing between said rows.

16. Apparatus in accordance with claim 15 including means responsive to the lateral movement of the support means following movement to gripping position of the last upstream gripper of the last longitudinal row for effecting movement of said support means vertically in the direction of said case at said casing stations, and means responsive to the positioning of said bottles in said case for effecting retraction of said gripper means and subsequent vertical and lateral movement of said support means to a position wherein the first longitudinal row of gripper means is in alignment with said conveyor.

17. In apparatus for transferring bottles from a single file continuously moving conveyor to cases at casing stations positioned laterally of said conveyor comprising a set of bottle gripper and bottle stop means, said bottle gripper means of said set being arranged in lateral and longitudinal rows corresponding to the bottle receiving rows in said cases, laterally and vertically movable means for supporting and positioning said gripper means of said set above said conveyor so that the longitudinal rows are sequentially movable into alignment with said conveyor, the bottle stop means of said set comprising a first stop member normally extending into said conveyor path substantially in a vertical plane through the downstream lateral row of said gripper means, normally retracted other bottle stop members movable in the conveyor path substantially in the vertical planes of each of the other lateral rows of gripper means, and means responsive to the engagement of each of said bottle stop members for extending the next upstream bottle stop member into the conveyor path and for simultaneously moving the gripper means above the bottle engaging each stop member into its bottle gripping position.

18. In apparatus of claim 17 including at least a second set of bottle gripper means and bottle stop means arranged upstream of said first set, said bottle stop means including movable stop members, means normally retaining all of said bottle stop members and all of said gripper means of said second set in retracted position, means responsive to the movement of the last gripper means of the last row of gripper means of said first set for moving and retaining the downstream stop member of the second set into the conveyor path, and means responsive to the movement of the last gripper means of the last row of said second set for retracting the downstream member of said second set.

References Cited in the file of this patent
UNITED STATES PATENTS

| | | |
|---|---|---|
| 2,119,767 | Anderson | June 7, 1938 |
| 2,609,911 | Davis | Sept. 9, 1911 |
| 2,730,279 | Enock | Jan. 10, 1956 |
| 2,834,167 | Loveridge | May 13, 1958 |
| 2,840,965 | Lewis | July 1, 1958 |